Inventors
SIEGFRIED KOFINK, LUDWIG HUBER, EWALD SCHUBERT,
WOLFGANG MAYER & MAX MÜNZENMAIER Bailey, Stephens & Huettig
ATTORNEYS INVENTORS
SIEGFRIED KOFINK
LUDWIG HUBER
EWALD SCHUBERT
WOLFGANG MAYER
MAX MUNZENMAIER BY Bailey, Stephens and Huettig

ATTORNEYS

3,125,855
TURBINE UNIT, IN PARTICULAR HEATING MEANS WITH A VIBRATION BURNER
Siegfried Kofink, Zell (Neckar), Ludwig Huber, Stuttgart-Degerloch, Ewald Schubert, Esslingen (Neckar), Wolfgang Mayer, Esslingen-Hegensberg, and Max Munzenmaier, Wernau, Germany, assignors to J. Eberspacher, Esslingen, Germany, a firm of Germany
Filed Apr. 4, 1960, Ser. No. 19,864
Claims priority, application Germany Apr. 4, 1959
2 Claims. (Cl. 60—39.52)

The present invention relates to a turbine unit especially suitable as a heating means. The invention relates in particular to a turbine unit provided with a vibration burner as the energy source, the hot gases of which can additionally be utilized in a heat exchanger. In such units the exit gases can be passed through a closed-circuit conduit containing the turbine, the conduit being provided with an exit. This closed-circuit conduit then recycles the exhaust gases to the vibration tube opening where the gases are again accelerated.

According to the invention there is arranged a cushioning chamber in front of an injector, which injector surrounds the vibration tube opening and sucks in the resonance free exhaust gases, and the turbine, to which the exhaust gas mixture exclusively is admitted on its complete circumference, is arranged behind the injector. The turbine drives a working device arranged outside of the closed-circuit conduit, in particular a pump or a blower, for conveying the medium to which the heat is transferred in the heat exchanger.

At the exit opening of the vibration tube the exhaust gases periodically leave the vibration tube with relatively high speed. The expulsion periods are, however, short and the amounts of available exhaust gas are small. Nevertheless the exhaust gases of vibration burners have already found application for the operation of turbines. Generally, however, only a few blades were actuated during one vibration process. Therefore turbine units constructed according to this principle did not give satisfactory results in practical operation. It has been attempted to increase the available amount of exhaust gases by using several vibration burners in parallel or series arrangement. By this, the disadvantage cannot be avoided that the exhaust gases are only available periodically. It is of essential importance for the invention that the jet of the exhaust gases is supplied by means of a closed-circuit conduit with spent exhaust gases, in order to thus increase the amount of gas admitted to the turbine, and further it is of importance that there is arranged a cushioning chamber in front of the sucking in point, i.e. the injector. In the injector the spent exhaust gases are accelerated in such a manner that a gas current also exists in the positive direction of the turbine during the low-pressure phase of the vibration burner. In consequence there is available, independently of a periodic gas source, a resonance free continuous gas current for driving the turbine.

By far the greater amount of the exhaust gas circulates in the closed-circuit conduit, and there is discharged from the discharge opening only such an amount of exhaust gas, as is newly admitted for each explosion step.

The cushioning chamber contains several times the amount of the gases discharged by the vibration burner during a vibration step, preferably more than the threefold amount, and it is particularly suitable to arrange the vibration burner within this cushioning chamber. In this manner there is obtained a good utilization of the heat, a reliable operation of the vibration burner and an automatically effective muffling.

In order to avoid at critical points an exit of the exhaust gases into the surrounding atmosphere, e.g. into an inhabited room, at least these critical points can be connected with a low-pressure point of the vibration burner, e.g. they can be connected to the sucking in space between the air filter and air valve. Small amounts of the exhaust gases discharged are then recycled again without difficulty into the closed-circuit conduit, greater amounts of the exhaust gases extinguishing the vibration burner. It may also be suitable to suck off the exhaust gases by means of a further injector provided in the exhaust current.

When using a blower there can further be generated a positive pressure which is introduced into an annular space between packing and bearing.

In further improving the invention, applicant has been succeeded in interrelating the individual features in a heating means united in a single constructional unit to a particularly advantageous effectiveness. This is achieved substantially by a coaxial arrangement of the parts in functional relationship to the heat exchange in respect to the main longitudinal axis of the heat transferring parts. In this case the drive of the hot air blower or water pump is effected by a radial turbine to which the driving means is admitted interiorly.

According to the invention the annular space arranged around the mixing cone of the injector finds application as additional muffler. For this purpose the annular space is connected on the one side with the vibration burner and the space surrounding the vibration tube, on the other side with the connecting piece of the exit of the exhaust gases and in this arrangement is effective as a muffling Helmholtz resonator.

A further embodiment of the subject matter of the present invention considering the safety requirements consists in an intermediate wall arranged between the heating area and the exterior housing jacket. By this intermediate wall the current of the heating medium is divided into parallel currents with the same flow direction, which currents are again united after passing the heat exchanger areas. The intermediate wall can be arranged according to the invention in such a manner that the distance of the exterior jacket of the housing is adjustable, which adjustment can e.g. be effected by providing spacer elements. It has been found suitable to arrange the intermediate wall close to the housing wall, in which case the smaller portion of the heating medium flows through the exterior heat exchange channel.

By the arrangement of the intermediate wall not only is a direct radiation of the exterior jacket of the housing by the heating area prevented, but also a particularly efficient removal of the heat energy absorbed by the intermediate wall through the current of the heating medium passed on both sides is affected. The heat energy would otherwise be transmitted through radiation or convection to the exterior jacket of the housing. Accordingly by the invention the efficiency of the turbine and of the heating means are improved in a substantial manner, and an inadmissible heating of the fuel tank constructionally united with the heating means is avoided.

By the invention, a loss of the heat energy at the exterior jacket of the housing is prevented. This is of particular advantage for heating means e.g. in an automobile exposed to the slip stream.

As a further safety mechanism, excessive heating, particularly concerning the fuel container united structurally with the turbine or the heating means, is prevented according to the invention by a switching off means. This means can, e.g. be effective on a valve in the fuel admission tube or at the fuel tank, or in the combustion air admission conduit and consists substantially of a heat sensitive switching element provided in the heat exchanger, arranged to operate the switching off means, held in the open position with an engaging means against the pressure of a spring, in such a manner that the bimetallic flat spring disengages the engaging means in the switching position. By this the swtiching off means is disengaged by spring action.

The switching off means can e.g. consist of a valve controlling the fuel admission, and can be connected positively by means of an adjustment lever with the heat feeler. As long as the heating medium in the heating means dissipates heat sufficiently, the switching off means does not become effective.

In the drawing there are shown schematically in section embodiments of the inventive arrangement.

Figure 1:
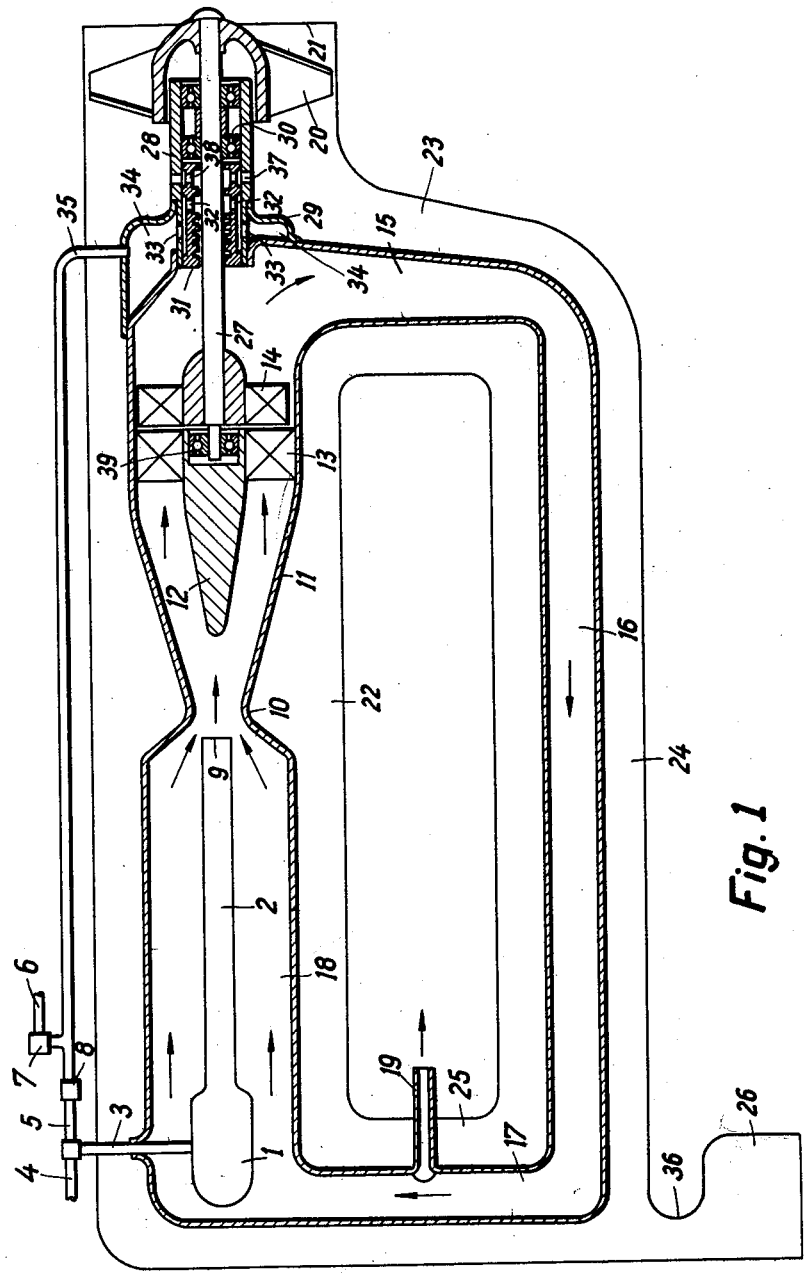
FIGURE 1 is a schematic section through a turbine according to the invention.

The vibration burner according to FIGURE 1 formed by the combustion chamber 1 and the vibration tube 2 and working according to the principle of a Helmholtz resonator is provided with combustion mixture through a mixing tube 3. This mixing tube is supplied through the conduit 4 with fuel, e.g. gasoline, and through the conduit 5 with air. Air arriving from 6 passes through the filter 7 and the valve 8. The electrically actuated ignition means which may be required for the starting up is not shown.

Opposite to the exit opening 9 of the vibration burner there is arranged the constriction 10 of an injector broadening at 11. The exhaust gases are admitted through this broadening and the core 12 to the stator 13 of the turbine 14. The exit gases leaving the turbine are conducted through the conduits 15, 16, 17 into the cushioning space 18 surrounding the vibration burner 1, 2 and from which space the vibration burner in cooperation with the injector 10, 11 again sucks off the spent exhaust gases. An exhaust gas conduit 19 connected with the conduit part 17 prevents the closed-circuit conduit 10, 11, 15, 16, 17, 18 from forming an overpressure. The exhaust gases can be discharged in any desired manner.

The closed-circuit conduit is formed as a heated part of a heat exchanger and for this purpose is surrounded by a jacket space. The blower 20 sucks air through the opening 21 and then passes this air in part through the channel 22 surrounding the turbine, the injector and the cushioning space, and in part through the branch conduit 23 into the tube 24. The air current from channel 22 passes through the tube 25 and combines with the air current of the tube 24, and both leave the heat exchanger through the connecting piece 26.

The turbine 14 and the blower 20 are carried by a shaft 27, the bearing body 28 of which is mechanically mounted by means of a sheet metal hood 29 on the outer wall of conduit 15. On the side of the bearing 30 opposite to the turbine there is arranged a packing member 31, the left part of which has the form of a labyrinth packing. The last step of this labyrinth packing is connected through the openings 32 and 33 with a protective space 34, which space connects through the conduit 35 with the low pressure point between the filter 7 and the valve 8. Exhaust gases passing through the packing are in consequence sucked off in this manner. In addition an overpressure is generated by the constriction 36 in front of the connecting piece 26 within the exterior heat exchanger jacket penetrating through the openings 37, 38 into the last part of the packing. In consequence an air current is moved in the opposite direction to the exhaust gas current and prevents in this manner any penetration of exhaust gases into the ball bearing.

Although in the embodiment as illustrated there is shown within the core 12 a second bearing 39, in most of the cases, a second bearing will be superfluous and can probably be deleted for economy.

Figure 2:
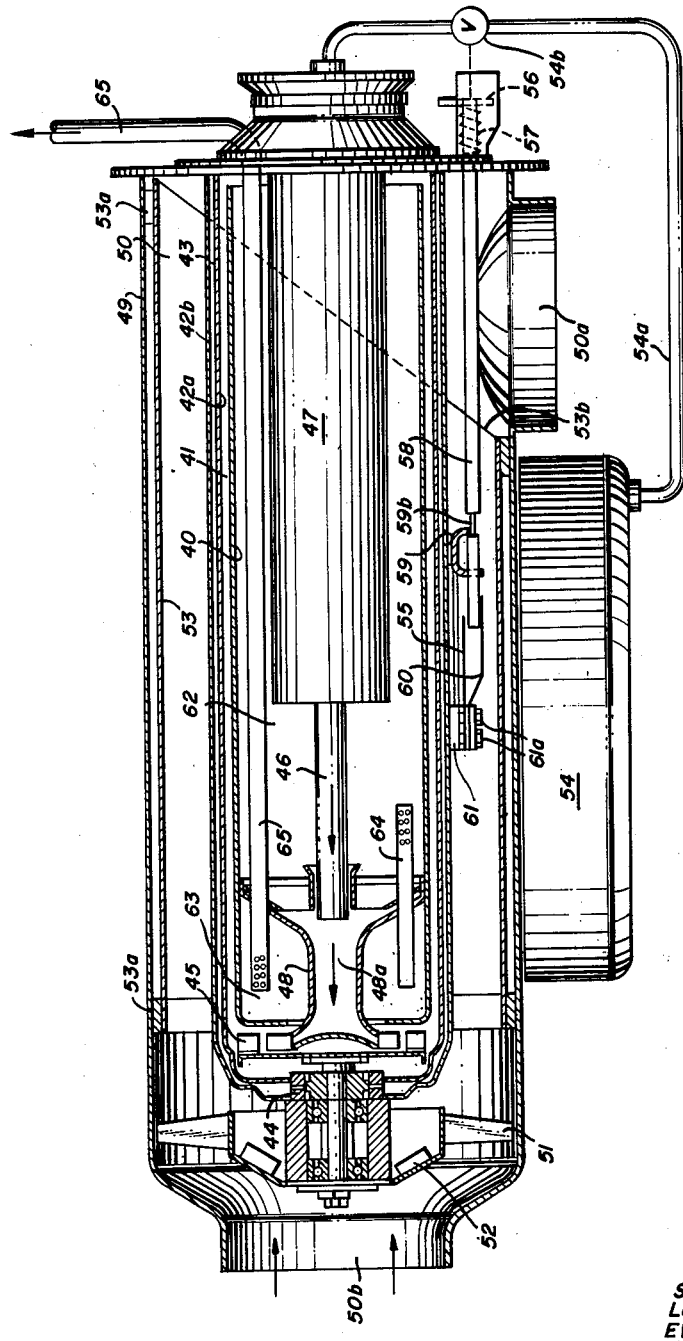
FIGURE 2 is an air heating means in the form of a structural unit consisting of vibration burner, turbine and heat exchanger.

In the embodiment according to FIGURE 2 there is provided around the interior tube 40 of the heat exchanger an annular space 41 for the exhaust gases, which annular space is surrounded by a double jacket 42a, 42b. This double jacket 42a, 42b includes the safety space 43 and is sealed with the packing 44 in respect to the shaft aperture. Coaxial to the heat exchanger means there is provided the turbine 45 connected with the vibration tube 46 of the vibration burner 47 by means of the injector 48. The parts as described are arranged concentrically in the exterior casing 49 of the housing in such a manner, that an air admission channel 50 is formed. In this channel the air blower 51 is arranged coaxially in respect to the interior parts described, by which blower the fresh air entering at 50b is sucked over the heat exchanger area of the double jacket 42a, 42b and leaves the latter at 50a as hot air. The additional blower 52 is provided for the cooling of the turbine 45 and the bearing points of the latter.

The annular type heat exchanger 50 (air guiding channel), formed between the exterior jacket 49 of the housing and the double jacket 42a, 42b representing the heat exchanger area, in this embodiment is subdivided by a cylindrical intermediate wall 53. The intermediate wall 53 is centered in the heat exchanger by spacer elements 53a which may consist e.g. of sheet material brackets and simultaneously serve for the fastening of the intermediate wall 53. At 53b the intermediate wall 53 is cut away so as to provide communication with the outlet connecting piece 50a, so that the heating air can pass freely into this connecting piece. The fresh air current sucked in by the blower 51 is, as can be gathered from the figure, subdivided in the heat exchanger 50 by the intermediate wall 53 into two partial currents, and the main current is passed over the heating areas of the double jacket 42b while a second current passes between walls 49 and 53. In this manner a free heat exchange is provided and the heat energy absorbed by the intermediate wall is not radiated to the surrounding atmosphere and the second current heats the fuel tank 54 connected with the exterior jacket 49 of the housing. This energy is transmitted to the tank by the comparatively small partial air current between the exterior jacket 49 of the housing and the intermediate wall 53 and is then again united with the main air current in the exit connecting piece 50a and the two are then passed to a common point of utilization. The total degree of efficiency of the heating means is substantially increased by avoiding a loss of heat energy.

In addition there is provided a mechanically actuated safety device. This device consists substantially of a bimetal strip 55 formed as a heat feeler co-operating with a switching off device 56 for the fuel. The switching device 56 is held against the tension of the spring 57 and thus holds the valve 54b, which valve is located in the fuel admission tube 54a in the open position. The bimetal strip 55 is clamped with a flat spring 60 holding the adjustment lever 58 in the locking device 59b, in a holding means. This holding means is adjustable by means of the screws 61a, and by this the operating point of the bimetal strip 55 can be adjusted. The bimetal strip 55 is arranged in such a manner that it lifts the adjustment lever 58 from the locking position 59 when a predetermined temperature is reached, which adjustment lever is then moved to the right and closes the valve 54b under the pressure of the spring 57.

In addition to the vibration burner 47 and the cushioning volume 62 surrounding the vibration tube 46, the annular space 63 surrounding the mixing core 48a of the injector also has a muffling effect. This muffling effect is even increased by their arrangement as Helmholtz resonator. For this purpose the annular space 63 is connected by the tube 64 with the cushioning chamber 62 and is provided by the exhaust gas conduit 65 discharging to the atmosphere with the mass retarding exit.

Figure 3:
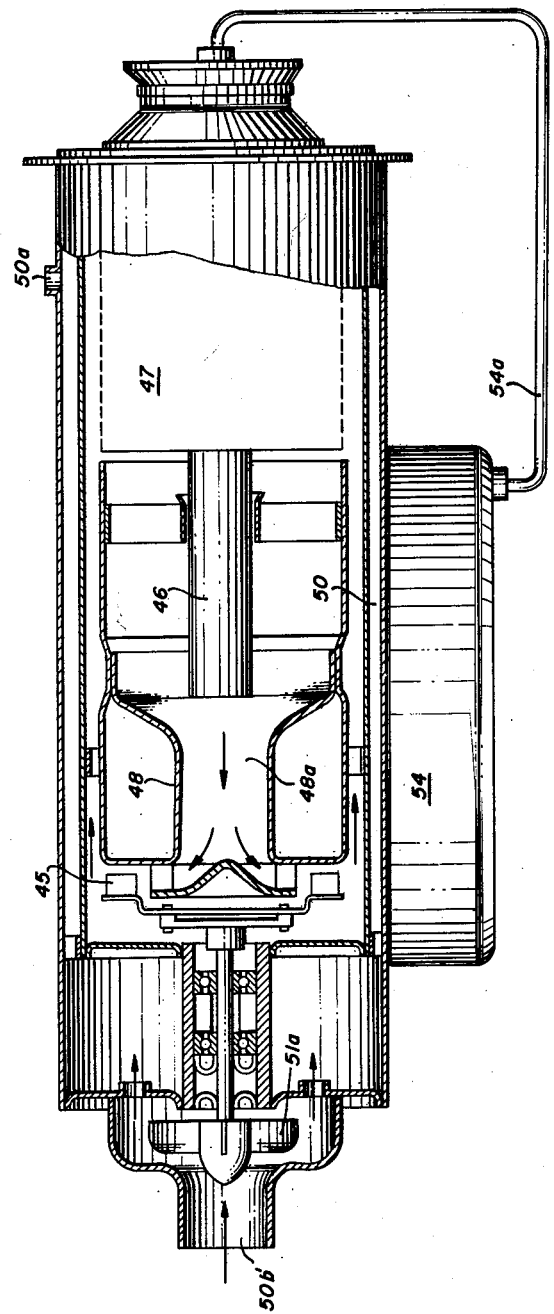
FIGURE 3 is a further embodiment of the air heating means according to FIGURE 2 with water circulation.

A heating means arranged principally in the same manner working with water as a heating medium is shown in FIGURE 3. In consequence the conveyor means for the heating medium consists of a water pump 51a conveying the water entering 50b' over the annular type heat exchange channel 50'. The water exit 50a' can e.g. be connected with the cooling water circuit in motor vehicles. The mode of operation of the turbine 47 is the same as in the above described embodiment.

What we claim is:

1. A turbine heater comprising inner and outer tubes one within the other, the outer tube extending beyond the ends of the inner tube and being closed at both ends, thus forming a substantially endless conduit, said conduit having an exhaust outlet, an automatically operating vibration burner with in the inner tube having a flame tube, a pipe-like casing surrounding the outer tube and spaced therefrom, turbine means in the conduit adjacent the discharge end of the inner tube, downstream of the burner, and means driven by said turbine connected with the space within said casing outside the outer tube to pass a fluid therethrough in heat exchange relation with the fluid in said conduit, said vibration burner producing a continuous, substantially resonance-free flow of a mixture of hot combustion gas issuing from said flame tube and of gas sucked along thereby through the conduit.

2. In a heater as claimed in claim 1, said conduit having at least one constriction therein within the inner tube, said conduit including within the inner tube a portion of enlarged cross-section upstream of said constriction of substantially greater cross-section than the cross-section of the constriction, said flame tube being arranged in such portion and having its outlet opening located upstream from the constriction at a point where the cross-section of the conduit is greater than the cross-section of the constriction, said flame tube being of smaller cross-section than said portion, said tube periodically discharging combustion gases at high velocity into said restriction to form an injector therewith, said turbine means being located on the other side of the constriction from the flame tube.

References Cited in the file of this patent

UNITED STATES PATENTS

| | | |
|---|---|---|
| 2,504,320 | Gamble | Apr. 18, 1950 |
| 2,715,436 | Lafferentz | Aug. 16, 1955 |
| 2,748,564 | Marchal | June 5, 1956 |
| 2,750,733 | Paris | June 19, 1956 |
| 2,795,104 | Zinner | June 11, 1957 |
| 2,888,803 | Pon | June 2, 1959 |
| 2,906,092 | Haltenberger | Sept. 29, 1959 |

FOREIGN PATENTS

| | | |
|---|---|---|
| 1,029,994 | France | Mar. 11, 1953 |
| 666,519 | Great Britain | Feb. 13, 1952 |
| 455,323 | Italy | Feb. 22, 1950 |